No. 678,565. Patented July 16, 1901.
J. H. HERBST.
MEASURING FAUCET.
(Application filed Mar. 16, 1901.)
(No Model.)
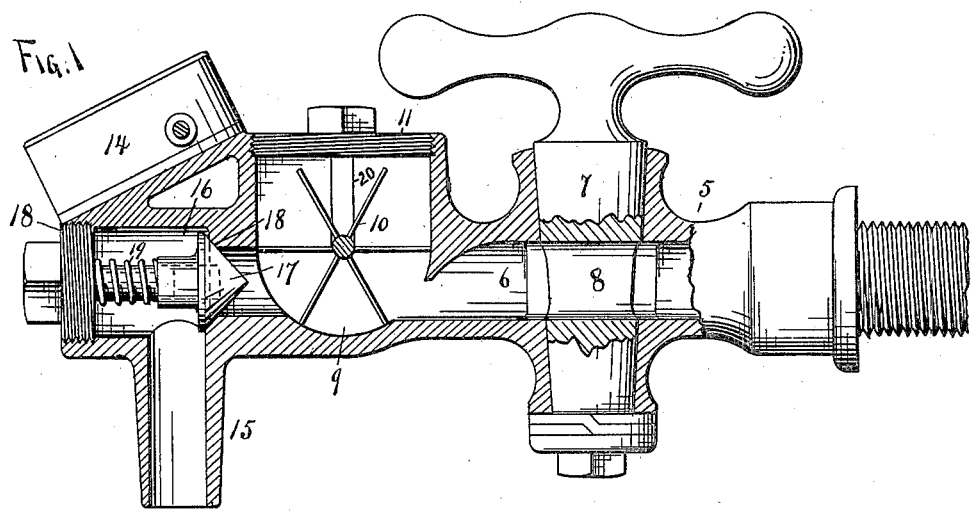
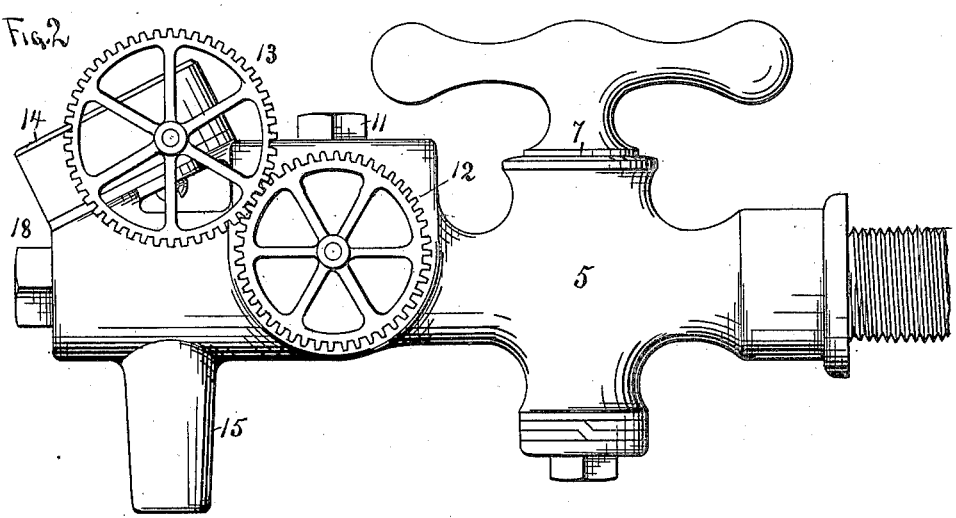
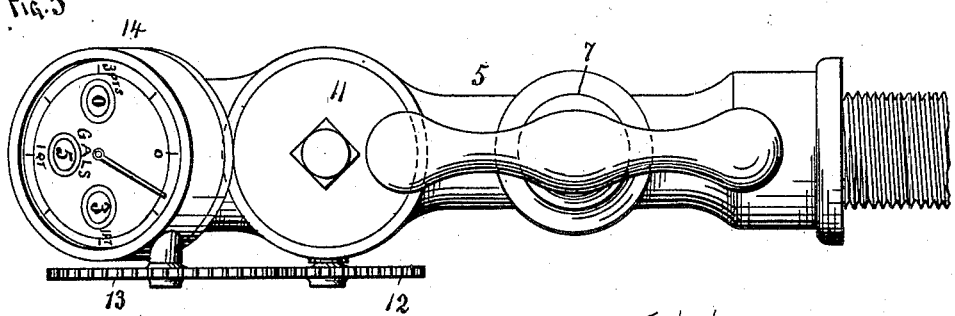
Witnesses
C. N. Woodward
Geo. H. Chandler
J. H. Herbst, Inventor
By C. A. Snow & Co.
Attorneys

UNITED STATES PATENT OFFICE.

JOHN H. HERBST, OF ELMIRA, NEW YORK.

MEASURING-FAUCET.

SPECIFICATION forming part of Letters Patent No. 678,565, dated July 16, 1901.

Application filed March 16, 1901. Serial No. 51,506. (No model.)

*To all whom it may concern:*

Be it known that I, JOHN H. HERBST, a citizen of the United States, residing at Elmira, in the county of Chemung and State of New York, have invented a new and useful Measuring-Faucet, of which the following is a specification.

This invention relates to measuring-faucets wherein the quantity of liquid that passes through the faucet is measured; and it has for its object to provide a construction wherein the measurement will be most accurate by cutting off the flow from the faucet as soon as the turning-plug is operated.

In the drawings forming a portion of this specification, and in which like numerals of reference indicate similar parts in the several views, Figure 1 is a view of the faucet, partly in longitudinal section and showing the interior structure thereof. Fig. 2 is a side elevation of the faucet. Fig. 3 is a top plan view of the faucet.

Referring now to the drawings, the present faucet comprises a casing 5, including a plug-chamber 6, in which is rotatably disposed a tapered plug 7, having a transverse opening 8 for alinement with the bore of the casing to open the faucet, this plug having the usual handle and being operable in the usual manner.

In advance of the chamber 6 is a second chamber, 9, the lower portion of which communicates with the bore of the casing 5, and, in fact, said bore passes through the lower end or bottom of the chamber, and at opposite sides of this chamber are bearings for the ends of the axle of a paddle-wheel 10, which fits the chamber closely, so that as liquid passes through the chamber the wheel will be positively rotated, its speed of rotation being commensurate with the speed of the liquid. The bearings for the axle of the paddle-wheel are in the form of perforations through the walls of the chamber, and to permit of placing the axle a groove 20 is formed in one wall of the chamber and leading to a bearing, so that when one end of the axle has been engaged with the bearing at the opposite side the other end of the axle may be moved downwardly through the groove to the bearing. If desired, the bearing at this end of the axle may be formed by the bottom of the groove instead of by a perforation. These are mere details, however, and may be modified as desired. In the present instance the wheel-chamber is provided with a closure in the form of a screw-plug 11 to permit of application and removal of the wheel as occasion may require. The axle of the paddle-wheel projects at one end through the side of the wheel-chamber and is provided with a gear 12, engaged with a second gear 13 upon the actuating-shaft of a meter 14, so that the liquid flowing through the faucet may be measured, this meter having any desired specific construction and in the present instance is shown as adapted for measuring pints, quarts, and gallons, with fractions thereof, as well as multiples of gallons.

The spout 15 of the faucet opens into the bore of the faucet at right angles thereto and in the rear of the outer end of the casing, this outer end portion of the bore being increased in diameter to form a valve-chamber 16, in which is disposed a check-valve 17, adapted to enter a valve-seat 18 in the rear end of the valve-chamber, said valve closing in the direction of flow of fluid through the casing and the taper of the valve-seat thereof leading direct to the rear wall of the spout, so that when the valve is in closed position it will project over the spout and the entire amount of liquid that has passed into the valve-chamber will be drained therefrom. The stem of the valve 17 is slidably disposed in a plug 18, screwed into the end of the bore of the casing to close the valve-chamber, and said valve is held yieldably in closed position by means of a helical spring 19, disposed upon its stem and bearing at opposite ends against the head of the valve and the inner end of the plug.

With this construction it will be seen that when the plug of the faucet is turned to open the faucet there will be a flow through the faucet and the paddle-wheel will be positively turned to actuate the meter and that only such liquid as has been measured will run from the faucet; also, that as soon as the plug is turned to cut off the flow the check-valve will be seated and such liquid as might otherwise leak through and around the paddle-wheel and from its chamber is prevented from running out at the spout of the faucet. The measuring is therefore accurate.

It will be understood that in practice modifications of the specific construction shown may be made and that any suitable materials and proportions may be used for the various parts without departing from the spirit of the invention.

What is claimed is—

1. A measuring-faucet comprising a casing having a cut-off valve for regulating the flow of liquid therethrough, a paddle-wheel disposed beyond the valve for actuation by liquid passing through the casing, a discharge-spout, and a check-valve disposed at the upper end of the spout and having means for closing it when the flow through the casing is cut off.

2. A measuring-faucet comprising a casing having a cut-off valve for regulating the flow through the casing, a measuring paddle-wheel disposed for actuation by liquid flowing through the casing beyond the valve, a spout depending from the casing, a valve-seat in the casing terminating at the rear wall of the spout, a check-valve disposed for engagement with the seat, and means for holding the check-valve yieldably in its seat when the flow through the casing is cut off.

In testimony that I claim the foregoing as my own I have hereto affixed my signature in the presence of two witnesses.

JOHN H. HERBST.

Witnesses:
MATTHIAS H. McMAHON,
A. B. GALATIAN.